United States Patent

Fisher et al.

[11] Patent Number: 5,730,463
[45] Date of Patent: Mar. 24, 1998

[54] AIR BAG FOLD AND METHOD

[75] Inventors: Margaret Ann Fisher, Dayton, Ohio; Timothy Wayne Hill, Troy, Mich.

[73] Assignee: General Motors Corporation, Detroit, Mich.

[21] Appl. No.: 571,623

[22] Filed: Dec. 13, 1995

[51] Int. Cl.⁶ .................................................. B60R 21/20
[52] U.S. Cl. ........................ 280/743.1; 280/728.1
[58] Field of Search .................... 280/743.1, 728.1, 280/730.2, 730.1

[56] References Cited

U.S. PATENT DOCUMENTS

| | | | |
|---|---|---|---|
| 3,779,577 | 12/1973 | Wilfert | 280/150 |
| 5,273,309 | 12/1993 | Lau et al. | 280/730 A |
| 5,419,579 | 5/1995 | McPherson et al. | 280/743.1 |

FOREIGN PATENT DOCUMENTS

| | | |
|---|---|---|
| 06 227353 | 8/1994 | Japan . |
| 06 255436 | 9/1994 | Japan . |

*Primary Examiner*—Brian L. Johnson
*Assistant Examiner*—Jonathan E. Butts
*Attorney, Agent, or Firm*—Kathryn A. Marra

[57] ABSTRACT

An air bag module in a vehicle includes an inflator for generating gas to inflate an air bag. The air bag has a first portion adjacent the inflator and operatively connected to the inflator for receiving the inflator gas therein. The air bag has a second portion extending from the first portion and spaced apart from the inflator by the first portion. The second portion is unidirectionally rolled to define a rolled portion. Prior to air bag inflation, the first portion is stored atop the inflator and the rolled portion is stored atop the first portion. Preferably, the rolled second portion forms a pinch point between the first portion and the second portion such that the first portion partially inflates prior to unrolling of the second portion. Preferably, the first portion is folded in manner to inflate more readily than the rolled second portion such that the first portion inflates and forces the rolled second portion outwardly away from the inflator prior to unfolding of the rolled second portion.

16 Claims, 6 Drawing Sheets

AIR BAG FOLD AND METHOD

This invention relates generally to vehicle air bag modules, and more particularly to an air bag having an improved fold configuration.

BACKGROUND OF THE INVENTION

It is well known in motor vehicles to employ inflatable air bag to restrain an occupant. Air bags are commonly mounted in an air bag module subassembly with an inflator for generating gas to inflate the air bag upon sensing predetermined vehicle conditions. The air bag module may be mounted in the instrument panel, the seat, the door, or other locations within the vehicle.

It is known to provide an air bag suited for side impact protection of the head and/or torso of the occupant. Air bags used in side impacts must deploy from the module and unfold very quickly, preferably in less than about 10 milliseconds. Thus, every millisecond of improvement in air bag deployment time is significant.

Typically in modules for side impacts, the entire air bag is folded into a full accordion fold. Thus, the entire air bag is folded back and forth in an accordion-like style. While this fold has proved satisfactory for many applications, it is desirable to provide an improved air bag fold which reduces the time for the air bag to unfold during deployment.

SUMMARY OF THE INVENTION

This invention provides an improved air bag fold and method of folding which is particularly well-adapted for use with air bags in air bag modules for side impact. This invention significantly reduces the time required for the air bag to unfold when compared with other typical folds, such as the full accordion fold. This invention reduces the deployment time for a comparable air bag to unfold by 2-3 milliseconds over a typical full accordion fold. This is a substantial improvement considering the short amount of time available to unfold the air bag during a side impact event.

These advantages are accomplished in the present invention by providing an air bag module in a vehicle including an inflator for generating gas to inflate an air bag. The air bag has a first portion adjacent the inflator and operatively connected to the inflator for receiving the inflator gas therein. The air bag has a second portion extending from the first portion and spaced apart from the inflator by the first portion. The second portion is unidirectionally rolled to define a rolled portion. Prior to air bag inflation, the first portion is stored atop the inflator and the rolled second portion is stored atop the first portion. Preferably, the rolled second portion forms a pinch point between the first portion and the second portion such that the first portion partially inflates prior to unrolling of the second portion. The module is preferably mounted in a seat of the vehicle, but may also be mounted at any location on the vehicle.

According to another aspect of the invention, the first portion is preferably folded in a manner to inflate more readily than the second portion such that the first portion inflates and forces the rolled second portion outwardly away from the inflator prior to unfolding of the rolled second portion. In one embodiment, the air bag deploys in a longitudinal direction and the first portion of the air bag includes a plurality of laterally extending pleats forming an accordion pleat stack positioned atop the inflator. Alternately, the first portion of the air bag is scrunched into a compact shape atop the inflator and beneath the rolled second portion prior to air bag inflation.

It is also an object of the invention to provide a method of folding an air bag having a first portion adjacent and operatively connected to an inflator for generating gas to inflate the air bag and having a second portion spaced apart from the inflator by the first portion. The method includes the step of providing a continuous unidirectional roll in the second portion to form a pinch point between the first portion and the second portion. The method may also include the step of folding the first portion in a manner such that the first portion will initially inflate and force the second portion outwardly away from the inflator prior to unfolding of the second portion.

Also in accordance with the invention, the first portion may be provided with a plurality of lateral pleats folded back and forth such that the first portion is folded into an accordion pleat stack atop the inflator and the rolled second portion is positioned atop the first portion. Alternately, the first portion may be scrunched into a compact bunch lacking well-defined folds and the first portion is positioned atop the inflator and the rolled second portion is positioned atop the first portion.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1:
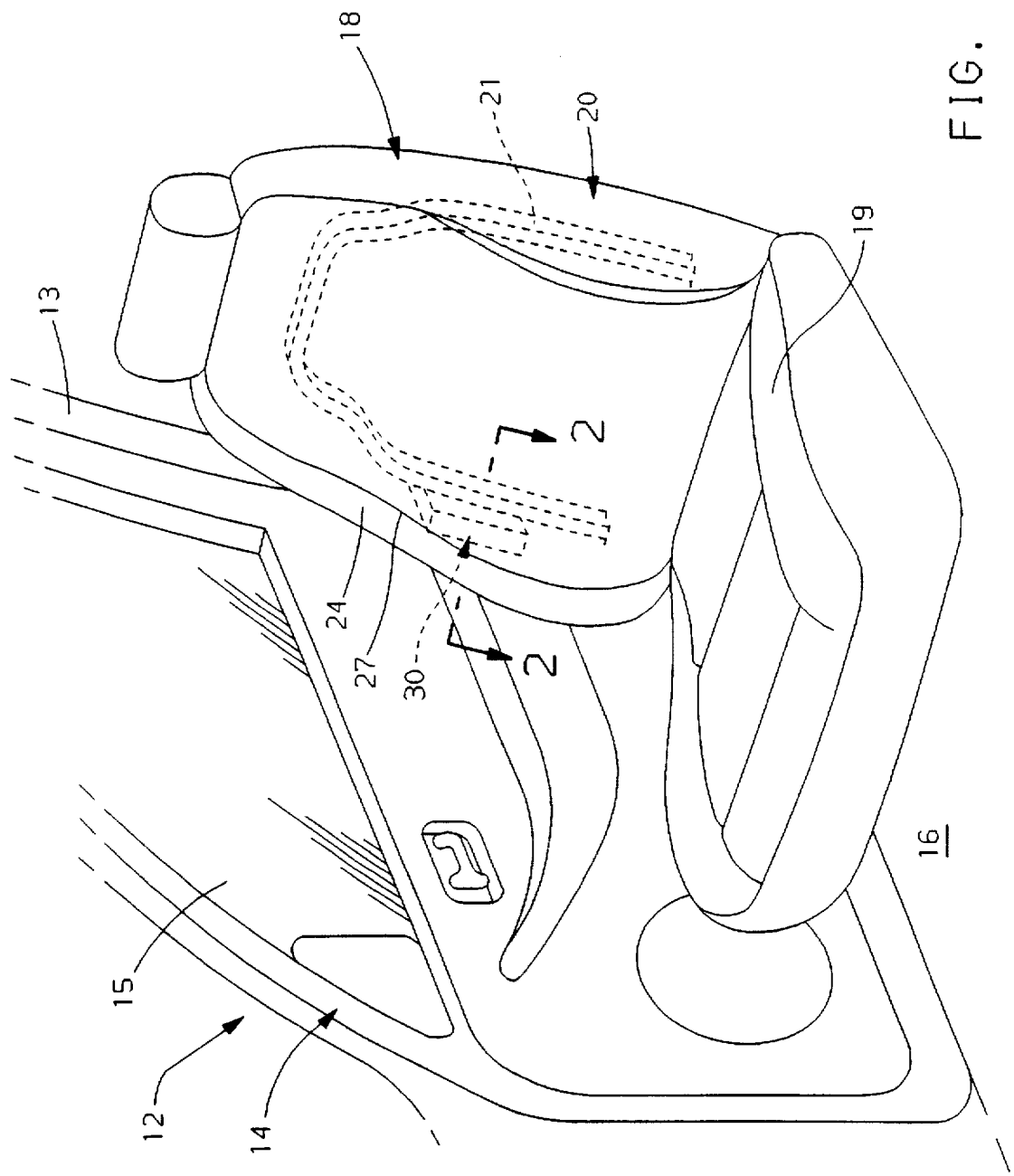
FIG. 1 is a perspective view showing a vehicle seat having an air bag module including an air bag folded in accordance with the present invention.

Referring to FIG. 1, it is seen that a vehicle 12 includes a door 14 having a movable window 15 mounted thereon. An interior 16 of the vehicle 12 includes side pillars 13 and a seat 18 for a vehicle occupant (not shown), the seat 18 having a seat bottom 19 and an upper seat back 20. The seat back 20 includes a rigid seat frame 21, preferably being metal or other suitable strength material. The seat frame 21 is encompassed within a foam cushion portion 22 covered by fabric seat material 24 defining the outer contour of the seat back 20. The fabric seat material 24 of the seat back 20 further includes a vertically extending frangible seat seam 27 proximate the door 14.

Figure 2:
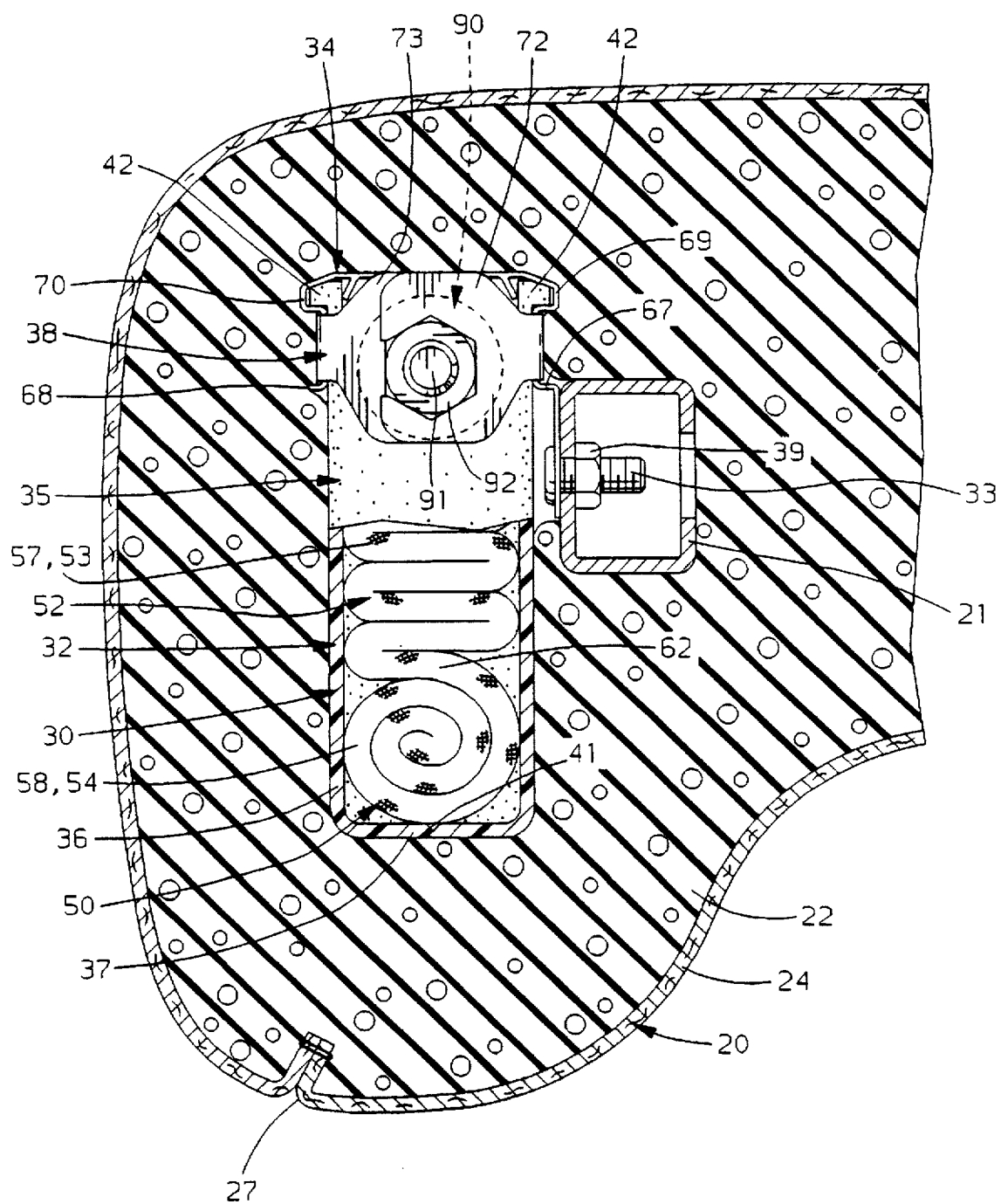
FIG. 2 is a section view taken in the direction of arrows 2—2 of FIG. 1 and showing the module partially-broken-away.

FIG. 2 best illustrates the component parts of a complete air bag module, generally designated as 30. The module 30 includes an inflator 90, an air bag 50, a housing 32 and mounting studs 33 extending from the housing 32 for mounting the entire module 30 to any suitable vehicle structure, such as the seat frame 21.

Figure 4:
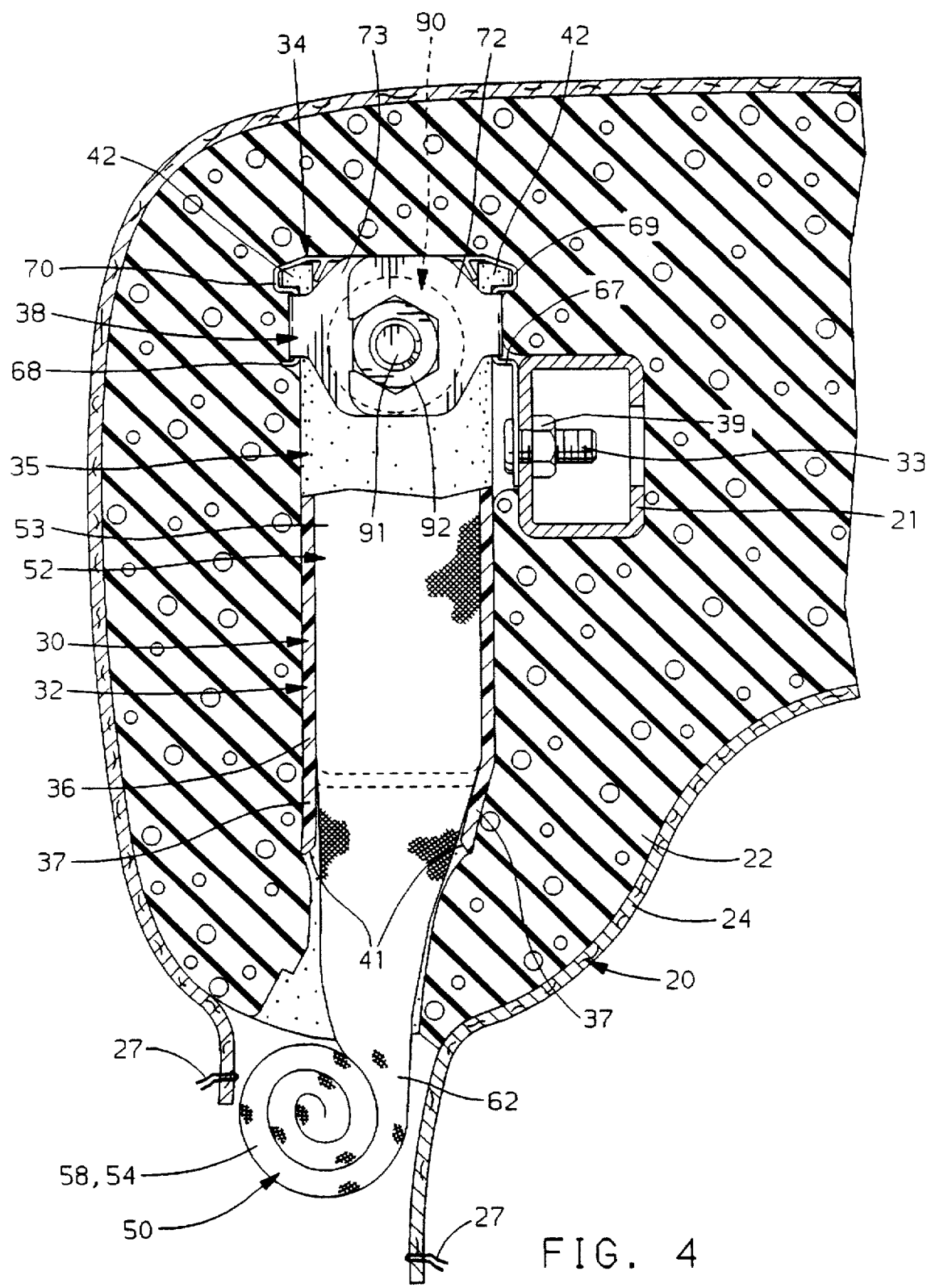
FIG. 4 is a section view taken in the direction of arrows 4—4 of FIG. 3 and showing the module partially-broken-away.

The housing 32 may be of any suitable construction for housing the inflator 90 and air bag 50 prior to air bag inflation and is in no way limited to the particular embodiment shown. The particular housing 32 shown includes a frame 34, a cover 35, and a retainer strap 38. The frame 34 is an extruded channel of a suitable strength material and having side walls 67, 68 and slide locking features 69, 70. The side wall 67 carries a pair of mounting studs 33 which enable attachment of the frame 34 to the seat frame 21 as shown in FIGS. 2 and 4. The cover 35 is preferably a molded plastic material having cover side walls 36 defining a box shape and having a break-apart end wall 37. As shown in FIG. 2, the break-apart end wall 37 has a molded in place detent 41 which breaks open during air bag deployment. The cover 35 has integral legs 42 which provide a slide locking feature for slidably connecting the cover 35 to the frame 34. The housing 32 further includes a retainer strap 38 which is preferably of a stamped steel construction. The retainer strap 38 has a generally rectangular shape which fits over the frame 34 and includes overlapping end flaps 72, 73. After the cover 35 is slid into the frame 34, the retainer strap 38 is installed to lock the cover 35 and frame 34 against relative sliding movement.

Figure 5A:
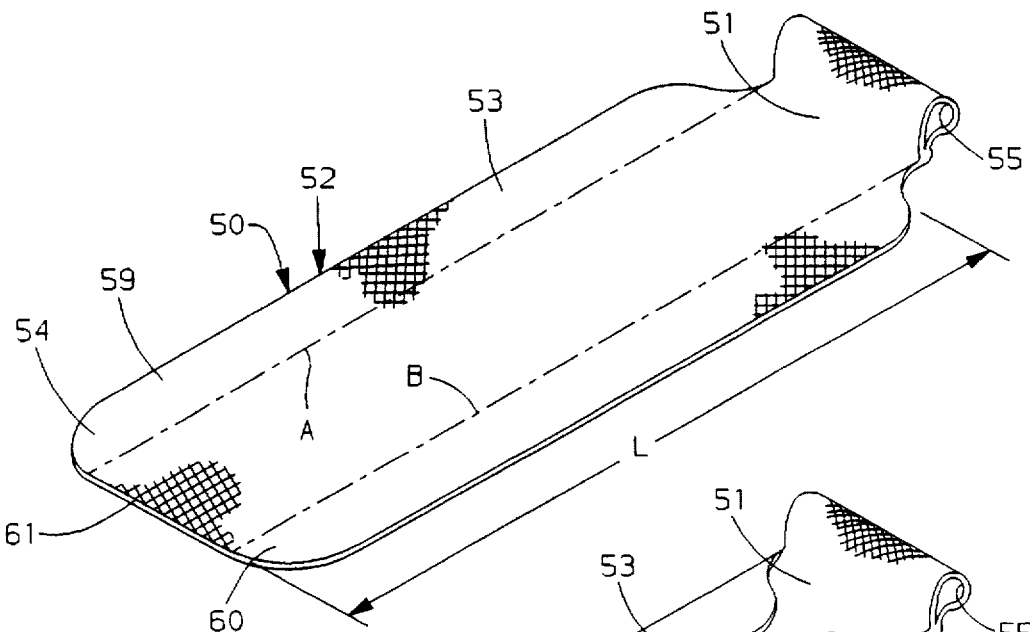
FIGS. 5A–5D are perspective views illustrating the steps for folding the air bag according to the present invention.
Figure 5B:
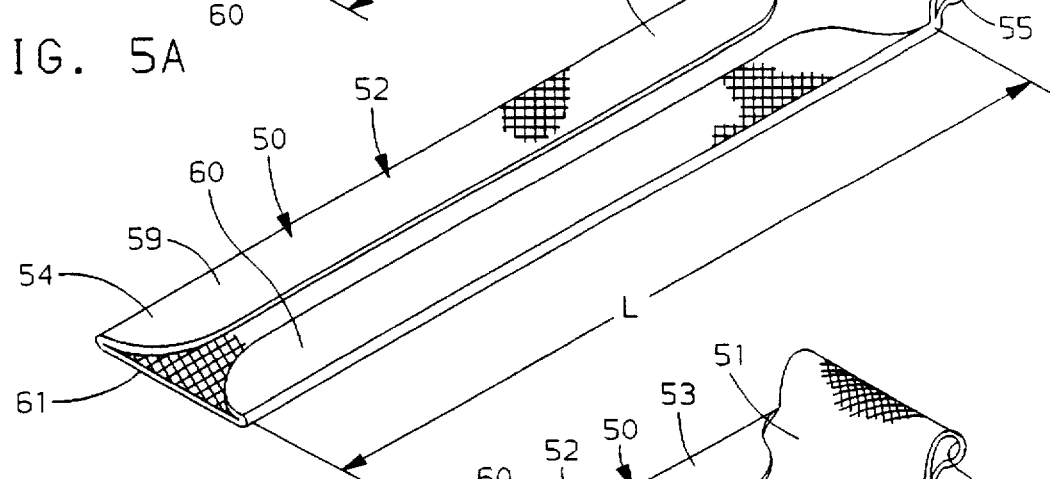
Figure 5C:
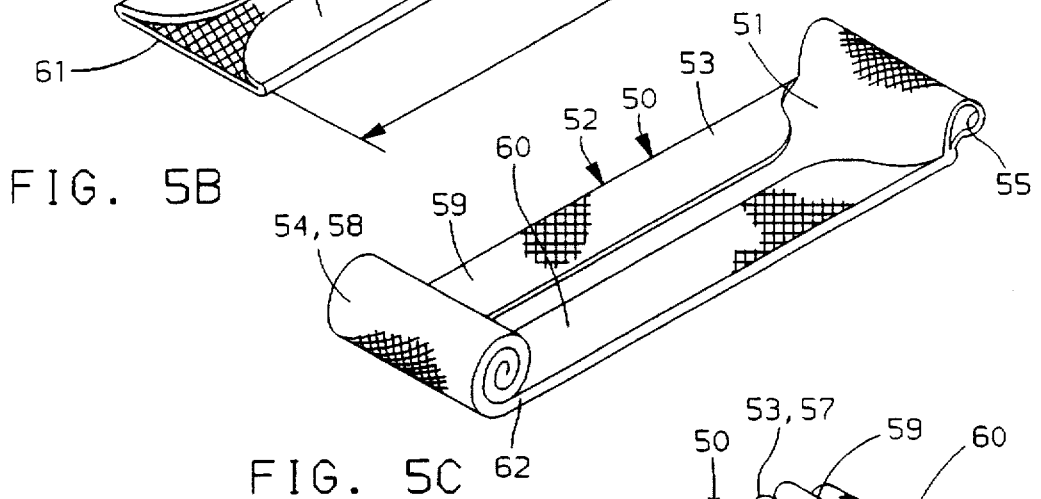
Figure 5D:
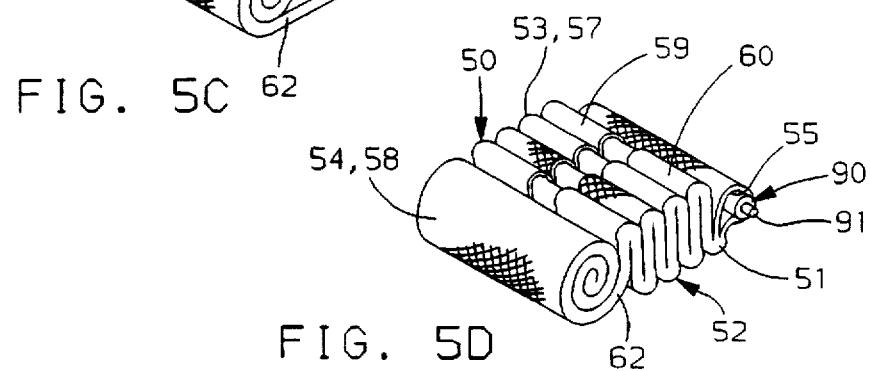

As best shown in FIGS. 2, 4, and 5D, the inflator 90 may be of any conventional construction which contains chemicals for igniting to generate gas for discharge upon the existence of predetermined vehicle conditions. The inflator 90 preferably has an axially elongated cylindrical body including ports (not shown) through which the inflator gas discharges to inflate the air bag 50. The inflator 90 is preferably slightly longer than the frame 34 of the housing 32 so that a threaded fastener 91 on an end of the inflator extends beyond the frame 34 and becomes encaptured within the end flaps 72, 73 of the retainer strap 38. As best shown in FIG. 2, a nut 92 is installed onto the threaded fastener 91 of the inflator 90 to fixedly attach the retainer strap 38 onto the frame 34 while simultaneously fixedly attaching the inflator 90 to the frame 34.

As best shown in FIGS. 5A-5D, the air bag 50 is made of a fabric material which is suitable for air bag construction. The air bag 50 includes a neck portion 51 having a side opening 55 which is suitably sized for receiving the inflator 90 therein. It will be appreciated that in the assembled condition, the neck portion 51 is preferably wrapped around the inflator 90 such that inflator gas is discharged directly into the air bag 50. The inflator 90 is axially inserted into the air bag 50 through the side opening 55 either before or after installation of the air bag 50 into the cover 35 of the housing 32. The air bag 50 includes an inflatable body portion 52 which inflates upon discharge of the inflator gas. The inflatable body portion 52 of the air bag 50 includes a first portion 53 adjacent the inflator 90 and operatively connected thereto via the neck portion 51. The air bag 50 also includes a second portion 54 which is a continuous extension of the first portion 53 and which is spaced apart from the inflator 90 by the first portion 53. As best shown in FIG. 2, the air bag 50 is normally stored in a folded condition within the cover 35 of the housing 32. Upon air bag deployment as shown in FIG. 4, the air bag 50 bursts out through the end wall 37 of the cover 35 and deploys in a longitudinal direction.

The first portion 53 of the air bag 50 is preferably substantially half a longitudinal length L of the air bag 50 and accordingly the second portion 54 is substantially the other half of the longitudinal length L of the air bag 50 as best shown in FIGS. 5A-5C. As best shown in the folded condition in FIGS. 2 and 5D, the first portion 53 includes a plurality of laterally extending pleats forming an accordion pleat stack 57 positioned atop the inflator 90 prior to air bag inflation. The second portion 54 is continuously unidirectionally rolled to form a rolled portion 58. The rolled portion 58 is stored atop the first portion 53 prior to air bag inflation.

The air bag 50 is folded in the following manner. Referring to FIGS. 5A and 5B, the air bag 50 is provided with a pair of longitudinally extending folds along lines A and B such that the air bag 50 has approximately the same lateral width as the inflator 90 prior to other folding operations. The flaps 59, 60 formed by the longitudinally extending folds are preferably positioned adjacent the door 14 of the vehicle 12 during air bag deployment. While a single longitudinal fold is shown to form the flaps 59, 60, it will be appreciated that any suitable number of longitudinally extending folds may be provided such that the air bag 50 has approximately the same lateral width as the inflator 90 so that the folded air bag 50 will fit in the housing 32.

Figure 3:
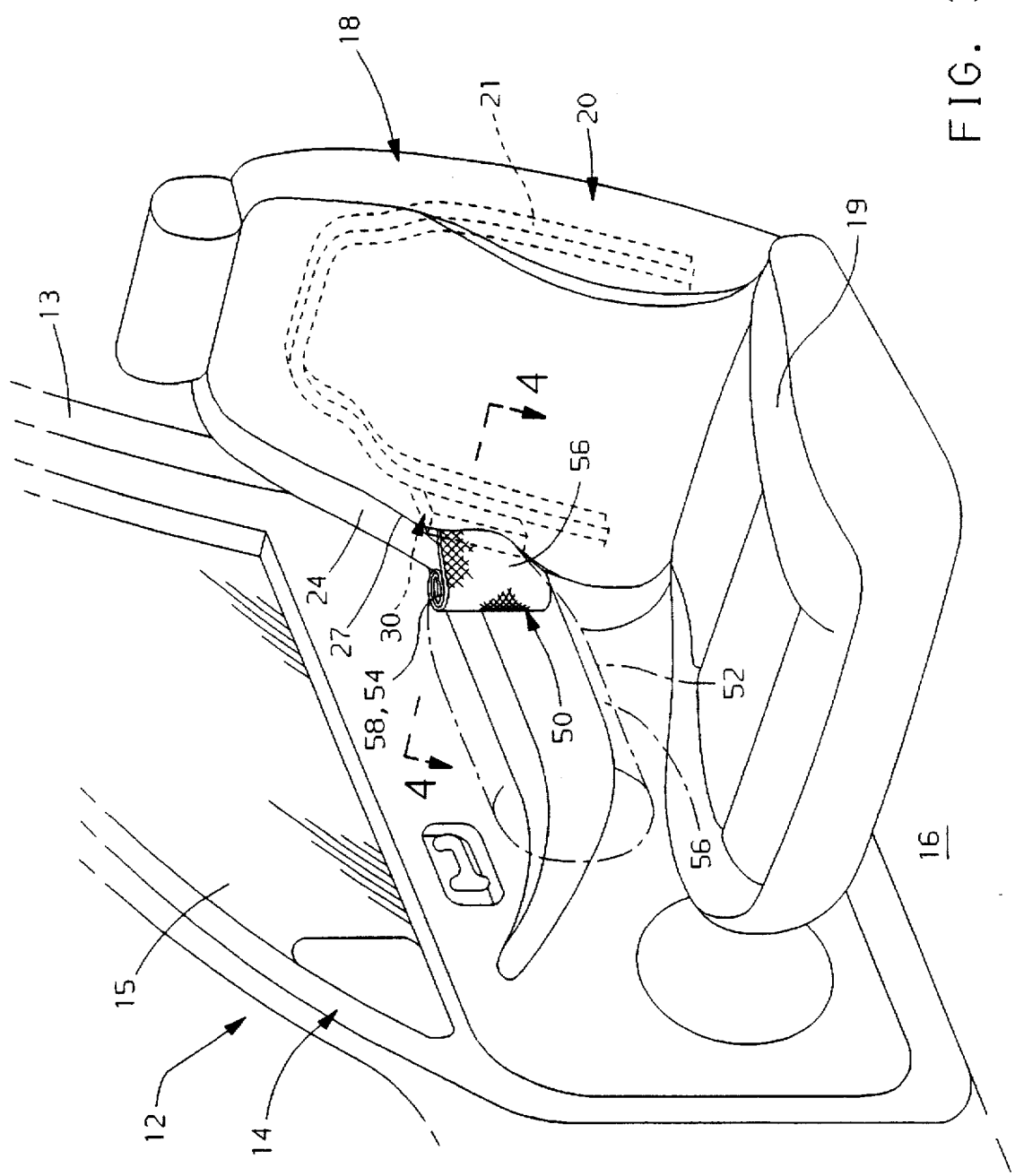
FIG. 3 is a perspective view similar to FIG. 1, but showing the air bag in a partially inflated condition in solid lines and showing the air bag in a fully inflated condition in phantom lines.

Preferably, the next step is to provide a continuous unidirectional roll in the second portion 54 of the air bag 50 as shown in FIG. 5C. The second portion 54 is preferably rolled in a direction towards the door 14 and away from the seat 18 as best shown in FIG. 3. The rolling is preferably started at an outermost end 61 of the second portion 54 located farthest away from the inflator 90 and the second portion 54 is unidirectionally rolled only up to the first portion 53. The second portion 54 being the rolled portion 58 forms a pinch point 62 on the air bag 50 at the junction between the first portion 53 and the second portion 54 which will be described further hereinafter.

Referring to FIGS. 2 and 5D, the first portion 53 of the air 50 is then provided with a plurality of laterally extending accordion pleats by folding the first portion 53 back and forth in an accordion style to form an accordion pleat stack 57 located adjacent the inflator 90. The completely folded air bag 50 is then installed in the cover 35 of the housing 32 to maintain the air bag 50 in the folded condition prior to deployment. It will be appreciated that the inflator 90 may be assembled to the air bag 50 either before or after the air bag 50 is folded and either before or after the air bag 50 is installed in the housing 32.

As best shown in FIG. 2, the entire module 30 is located completely within the foam cushion portion 22 of the seat back 20 and is mounted to the seat frame 21 by the mounting studs 33 and mounting nuts 39. Prior to deployment, the detent 41 of the end wall 37 of the cover 35 is roughly aligned beneath the frangible seat seam 27 of the seat back 20. In the stored condition, the first portion 53 being the accordion pleat stack 57 is positioned atop the inflator 90 and the second portion 54 being the rolled portion 58 is positioned atop the first portion 53.

Upon generation of gas by the inflator 90, the air bag 50 begins to inflate in a longitudinal direction. During the initial stages of inflation, the first portion 53 of the air bag 50 being the accordion pleat stack 57 is quickly filled with inflation gas and unfolds, thus forcing the second portion 54 being the rolled portion 58 outwardly away from the inflator 90 and out through the cover 35 and the frangible seat seam 27 as best shown in FIG. 4. It will be appreciated that the rolled portion 58 forms the pinch point 62 at the junction of the first portion 53 and the second portion 54, thus pinching off inflator gas so that the rolled portion 58 remains rolled while the first portion 53 inflates and the rolled portion 58 easily and quickly punches out through the cover 35, the foam cushion portion 22, and the frangible seat seam 27. Once the rolled portion 58 is clear of the seat 18, the second portion 54 being the rolled portion 58 very quickly unrolls so that the air bag 50 is completely unfolded in a very efficient manner and a very short time when compared to other folds for a comparable air bag. The air bag 50 is shown in the fully inflated condition in phantom lines in FIG. 3 where it is in position for side impact protection of the occupant seated in the seat 18. Preferably, the air bag 50 is folded such that the air bag 50 unrolls towards the door 14 and such that an inner face 56 of the air bag 50 facing the occupant is generally flat during deployment.

Advantageously, the air bag 50 of the present invention unfolds 2-3 milliseconds faster than a comparable air bag folded in a full accordion fold. The air bag 50 of the present invention also unrolls approximately 2 milliseconds faster than a fully rolled air bag. The air bag 50 also unfolds 1-3 milliseconds faster than any other fold configurations of comparable air bags that were tested. Thus, the air bag 50 having a first portion 53 which is provided with accordion pleat folds to form an accordion pleat stack 57 adjacent the inflator 90 and the second portion 54 which is unidirectionally rolled into a rolled portion 58 provides an unexpectedly fast deployment compared with other air bag folds which were tested. The improvement of 2-3 milliseconds over the traditional prior art full accordion fold is substantial since the time for the air bag 50 to unfold during a side impact event is typically less than 10 milliseconds.

It will be understood that a person skilled in the art may make modifications to the embodiments shown herein within the scope and intent of the claims. For example, although the module 30 is shown located in the seat 18, the module 30 may also be located in other locations in the vehicle 12 such as an instrument panel, the door 14, the side pillars 13 or any other vehicle 12 location. Although the first portion 53 and second portion 54 are each preferably about half of the longitudinal length L of the air bag 50, other proportions are possible as long as the first portion 53 includes a plurality of longitudinally extending pleats positioned atop the inflator 90 and the second portion 54 includes a unidirectionally rolled portion 58. For example, the first portion 53 could be ⅔ of the longitudinal length L of the air bag 50 and the second portion 54 could be ⅓ the longitudinal length L of the air bag 50 or vice-versa. It will be appreciated that many variations are possible. However, the entire air bag 50 cannot be rolled and the entire air bag 50 cannot be accordion folded or else the improvements in reduction of time for unfolding the air bag 50 during deployment will not be realized.

It will further be appreciated that while the second portion 54 of the air bag 50 must be unidirectionally rolled into a rolled portion 58 to form the pinch point 62 at the junction of the first portion 53 and the second portion 54, the first portion 53 of the air bag 50 may be folded in other manners, not including rolling, which fill more readily with inflator gas than the rolled portion 58 so that the rolled portion 58 is pushed outwardly by inflation of the first portion 53 during air bag deployment.

Figure 6:
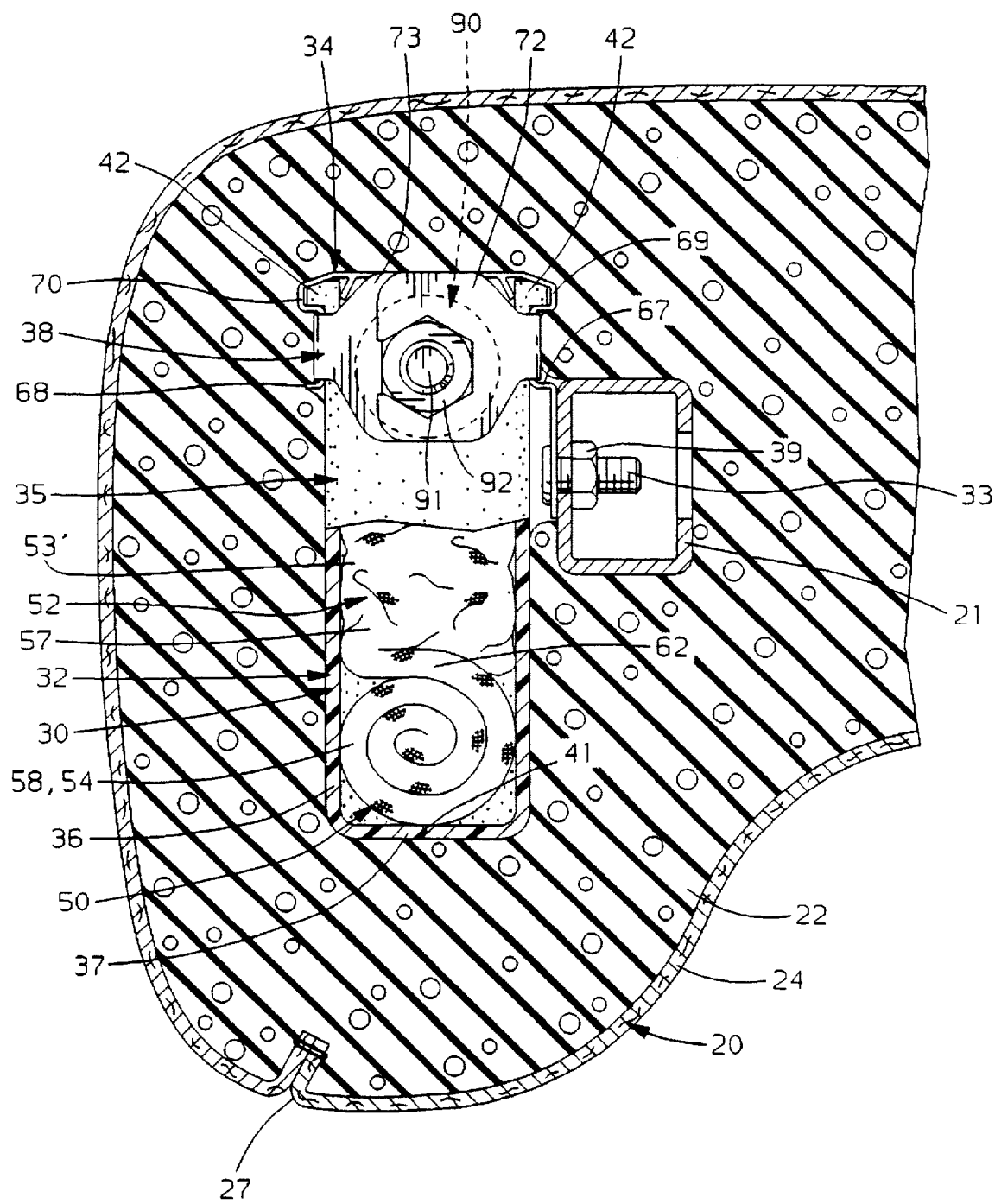
FIG. 6 is a section view similar to FIG. 2, but showing an alternate embodiment of the invention.

For example, FIG. 6 shows an alternate embodiment of the invention which has components with the same description as those in FIGS. 1-5D denoted with similar numerals. The only difference in the alternate embodiment of FIG. 6 is that the first portion 53' of the air bag 50 is scrunched into a compact condition lacking well-defined folds instead of being laterally folded into an accordion pleat stack. The first portion 53' is scrunched into a compact condition conforming to the shape of the housing 32 and is sandwiched in the housing 32 between the inflator 90 and the rolled second portion 54 when the air bag 50 is in the stored condition prior to deployment. Upon generation of gas by the inflator 90, the air bag 50 begins to inflate in a longitudinal direction. During the initial stages of inflation, the scrunched first portion 57 of the air bag 50 is quickly filled with inflation gas and unfolds, thus forcing the rolled portion 58 outwardly away from the inflator 90 and out through the cover 35 and the frangible seat seam 27. It will be appreciated that the rolled portion 58 forms the pinch point 62 at the junction of the first portion 53' and the second portion 54 such that the rolled portion 58 remains rolled and easily and quickly punches out through the cover 32, the foam cushion portion 22, and the frangible seat seam 27. Once the rolled portion 58 is clear of the seat 18, the second portion 54 very quickly unrolls so that the air bag 50 is completely unfolded in a very efficient manner and a very short time when compared to other folds of a comparable air bag.

While the present invention has been described as carried out in a specific embodiment thereof, it is not intended to be limited thereby but is intended to cover the invention broadly within the scope and spirit of the appended claims.

What is claimed is:

1. An air bag module in a vehicle, the air bag module including an inflator for generating inflator gas, and a housing having a breakable end wall, the module characterized by an air bag having a first portion operatively connected to the inflator for receiving inflator gas directly therein, the air bag having a second portion being a continuous extension of the first portion and spaced apart from the inflator by the first portion such that inflation gas may only be received in the second portion through the entire first portion, the first and second portions providing the entire inflatable air bag, the second portion being an entirely unidirectionally rolled portion prior to air bag inflation, the first portion being stored atop the inflator, the second portion being sandwiched atop the first portion and beneath the breakable end wall prior to air bag inflation, the first portion being folded in a manner to inflate more readily than the second portion and positioned entirely beneath the second portion, the first and second portions both closely conforming to the shape of the housing when stacked atop each other in the housing, such that upon air bag deployment, the first portion inflates and forces the rolled second portion outwardly away from the inflator such that the rolled second portion punches open the breakable end wall prior to unfolding of the rolled second portion.

2. The air bag module of claim 1 wherein the rolled second portion forms a pinch point between the first portion and the second portion such that the first portion partially inflates prior to unrolling of the second portion.

3. The air bag module of claim 1 wherein the air bag has a longitudinal length in a direction extending away from the inflator and wherein the first portion is substantially half the longitudinal length of the air bag and wherein the second portion is substantially half the longitudinal length of the air bag.

4. The air bag module of claim 1 wherein the air bag deploys in a longitudinal direction and wherein the first portion of the air bag includes a plurality of laterally extending pleats forming an accordion pleat stack positioned atop the inflator.

5. The air bag module of claim 1 wherein the first portion of the air bag is scrunched into a compact shape atop the inflator and beneath the rolled second portion prior to air bag inflation.

6. The air bag module of claim 1 wherein the module includes a housing having walls defining a shape of the housing and in which the air bag is stored prior to deployment and wherein the first portion of the air bag is in a scrunched, compact condition conforming to the shape of the housing and wherein the first portion is sandwiched in the housing between the inflator and the rolled second portion.

7. The air bag module of claim 1 wherein the vehicle includes a seat and wherein the module is stored within the seat and whereby upon air bag deployment the first portion forces the second portion out through the seat prior to unrolling of the second portion.

8. A method of folding an air bag for storage in a housing having a breakable end wall, the air bag having a first portion adjacent and operatively connected to an inflator for generating gas to inflate the air bag, the method comprising the step of:

dividing the air bag into a second portion forming substantially half of the air bag and the first portion providing substantially the other half of the air bag, placing the second portion spaced apart from the inflator by the first portion such that inflation gas can only be received in the second portion through the entire first portion and providing a continuous unidirectional roll in the entire second portion to form a pinch point directly between the first portion and the second portion, folding the first portion in a manner such that the first portion will inflate more readily than the second portion, placing the first portion in the housing atop the inflator, and sandwiching the second portion in the housing between the first portion and the breakable end wall such that the first portion is positioned entirely beneath the second portion and such that the first portion initially inflates and forces the second portion (54) outwardly away from the inflator for punching open the breakable end wall prior to unrolling of the second portion.

9. The method of claim 8 further comprising the steps of providing the roll on the second portion by starting the roll at an end of the second portion farthest away from the inflator and rolling the second portion only up to the first portion.

10. The method of claim 8 further comprising the steps of providing the first portion with a plurality of lateral pleats folded back and forth such that the first portion is folded into an accordion pleat stack atop the inflator and positioning the rolled second portion atop the first portion.

11. The method of claim 8 further comprising the steps of scrunching the first portion into a compact bunch lacking well-defined folds and positioning the first portion atop the inflator and positioning the rolled second portion atop the first portion.

12. The method of claim 8 further comprising the step of:

scrunching the first portion into a compact bunch within the housing between the second portion and the inflator.

13. The method of claim 8 further comprising the step of providing longitudinally extending folds such that the air bag has the same lateral width as the inflator prior to rolling the second portion of the air bag.

14. A method of folding an air bag, the air bag having a first portion adjacent and operatively connected to an inflator for generating gas to inflate the air bag and the air bag having a second portion spaced apart from the inflator by the first portion, the method comprising the steps of:

providing a continuous unidirectional roll in the second portion to form a pinch point between the first portion and the second portion; and scrunching the first portion into a compact bunch lacking well-defined folds and positioning the first portion atop the inflator and positioning the rolled second portion atop the first portion.

15. The method of claim 14 further comprising the steps of providing the roll on the second portion by starting the roll at an end of the second portion farthest away from the inflator and rolling the second portion only up to the first portion.

16. An air bag module in a vehicle comprising:

an inflator for generating inflator gas;

an air bag having a first portion adjacent the inflator and operatively connected thereto for receiving inflator gas therein, the air bag having a second portion extending from the first portion and spaced apart from the inflator by the first portion, the second portion being a unidirectionally rolled portion prior to air bag inflation, and the first portion being stored atop the inflator and the rolled second portion being stored atop the first portion prior to air bag inflation, and wherein the first portion is a scrunched portion being a compacted bunch lacking well-defined folds prior to air bag inflation.

* * * * *